United States Patent [19]

Sirkar

[11] Patent Number: 4,789,468
[45] Date of Patent: Dec. 6, 1988

[54] IMMOBILIZED-INTERFACE SOLUTE-TRANSFER APPARATUS

[75] Inventor: Kamalesh K. Sirkar, Scotch Plains, N.J.

[73] Assignee: The Trustees of the Stevens Institute of Technology, Hoboken, N.J.

[21] Appl. No.: 644,895

[22] Filed: Aug. 28, 1984

[51] Int. Cl.⁴ .............................................. B01D 13/00
[52] U.S. Cl. ...................................... 210/137; 210/90; 210/321.64; 210/321.65; 210/321.75
[58] Field of Search ............ 210/109, 111, 137, 321.1, 210/321.2, 331.65, 321.64, 331.75, 90

[56] References Cited

U.S. PATENT DOCUMENTS

| | | | |
|---|---|---|---|
| 2,365,457 | 12/1944 | Daniel | 210/637 |
| 3,396,510 | 8/1968 | Ward, III et al. | 55/16 |
| 3,422,008 | 1/1969 | McLain | 210/22 |
| 3,447,286 | 1/1969 | Dounoucos | 55/16 |
| 3,556,990 | 1/1971 | Gulko | 208/290 |
| 3,676,220 | 7/1972 | Ward, III | 136/86 |
| 3,719,590 | 3/1973 | Li et al. | 208/308 |
| 3,770,842 | 11/1973 | Steigelmann et al. | 210/677 A |
| 3,799,873 | 3/1974 | Brown | 210/321.3 X |
| 3,800,506 | 4/1974 | Hughes et al. | 55/16 |
| 3,823,529 | 7/1974 | Hughes et al. | 55/16 |
| 3,907,526 | 11/1975 | Jennings | 210/23 |
| 3,911,080 | 10/1975 | Mehl et al. | 423/210 |
| 3,925,037 | 12/1975 | Ward, III et al. | 55/158 |
| 3,951,789 | 4/1976 | Lee et al. | 210/22 |
| 3,956,112 | 5/1976 | Lee et al. | 210/500.2 X |
| 3,957,504 | 5/1976 | Ho et al. | 275/101 BE |
| 3,980,605 | 9/1976 | Steigelmann et al. | 260/30.8 DS |
| 4,000,065 | 12/1976 | Ladha et al. | 210/23 H |
| 4,005,012 | 1/1977 | Wrasidlo | 210/23 |
| 4,014,665 | 3/1977 | Steigelmann | 55/18 |
| 4,015,955 | 4/1977 | Steigelmann et al. | 55/16 |
| 4,062,882 | 12/1977 | Gupta | 260/428.5 |
| 4,106,920 | 4/1978 | Hughes et al. | 55/158 |
| 4,115,514 | 9/1978 | Ward, III | 423/232 |
| 4,117,079 | 9/1978 | Bellows | 423/223 |
| 4,119,408 | 10/1978 | Matson | 422/169 |
| 4,198,293 | 4/1980 | Ogawa et al. | 210/23 H |
| 4,214,020 | 7/1980 | Ward et al. | 427/296 |
| 4,220,535 | 9/1980 | Leonard | 210/456 X |
| 4,296,205 | 10/1981 | Verma | 435/240 |
| 4,303,068 | 12/1981 | Zelman | 210/137 X |
| 4,306,946 | 12/1981 | Kim et al. | 204/51 |
| 4,326,960 | 4/1982 | Iwahori et al. | 210/650 |
| 4,329,224 | 5/1982 | Kim | 210/79 |
| 4,366,063 | 12/1982 | O'Connor | 210/652 |
| 4,392,960 | 7/1983 | Kraus et al. | 210/651 |
| 4,406,752 | 9/1983 | Weininger et al. | 204/3 |
| 4,418,148 | 11/1983 | Oberhardt | 435/179 |
| 4,420,398 | 12/1983 | Castino | 210/641 |
| 4,443,414 | 4/1984 | Kim | 423/54 |
| 4,445,990 | 5/1984 | Kim et al. | 204/151 |
| 4,455,236 | 6/1984 | Kim | 210/721 |
| 4,554,069 | 11/1985 | Aid et al. | 210/137 X |

OTHER PUBLICATIONS

C. J. van Oss, in *Progress in Separation and Purification*, vol. 1, E. S. Perry, ed., (Interscience, 1968), pg. 211.

List continued on next page.

*Primary Examiner*—Ernest G. Therkorn
*Attorney, Agent, or Firm*—Pennie & Edmonds

[57] ABSTRACT

An immobilized-interface solute-transfer unit for transferring solute from a feed solution to an extractant liquid comprises a fluid-tight housing and a porous membrane which divides the housing into a feed solution chamber and an extractant chamber. The housing has feed solution inlet and outlet ports which communicate with the feed solution chamber, and extractant inlet an outlet ports which communicate with the extractant chamber. The solute-transfer unit also includes a presure difference controller for maintaining a difference between a liquid pressure of a feed solution in the feed solution chamber and a liquid presure of an extractant in the extractant chamber substantially within a predetermined pressure range so that an interface between the feed solution and the extractant is substantially immobilized at the membrane. The solute-transfer unit is particularly adapted for transferring a solute from a feed solution to an extractant, which feed solution and extractant are immiscible with one another when in direct contact.

19 Claims, 2 Drawing Sheets

OTHER PUBLICATIONS

A. S. Michaels et al. in *Membrane Processes in Industry and Biomedicine,* M. Bier, ed., (Pleneum Press, 1971) pg. 205.

C. P. Bean in *Membranes,* G. Eisenman, ed. (Marcel Dekker, 1972), pp. 34–35.

Y. Kuo and H. P. Gregor, *Separation Science and Technology,* vol. 18, pp. 421–440 (1983).

Kimura and Walmet, *Separation and Science and Technology,* vol. 15, pp. 1115–1133 (1980).

Kimura et al., *Recent Developments in Separation Science,* (CRC Press, Cleveland, Ohio, 1978), pp. 11–25.

R. E. Treybal, *Liquid Extraction,* 2nd ed. (McGraw-Hill, 1963), pp. 447–450.

H. D. Spriggs and N. N. Li in *Membrane Seperation Processes,* P. Meares, ed. (Elsevier, 1976) pp. 39–77.

F. L. Harris et al. in ibid. pp. 121–186.

Lee et al., A.I.Ch.E Journal, vol. 24, pp. 860–868 (Sep. 1978).

Kan and Shuler, Biotechnology and Bioengineering, vol. 20, pp. 217–230 (1978).

Webster and Shuler, Biotechnology and Bioengineering, vol. 20, pp. 1541–1556 (1978).

Travenol Laboratories, Inc. "Travenol TMO Membrane Oxygenator", Product Brochure (Jan. 1979).

Chemical Engineering, Oct. 17, 1983, pp. 16–17.

Kim, Presentation at Aiche Summer National Meeting, Denver, Col. (Aug. 29, 1983).

Webster, American Biotechnology Laboratory, pp. 29–35, Dec. 1983.

Chemical Week, June 27, 1984, p. 96.

Chemical and Engineering News, vol. 62, page 33 (Jun. 25, 1984).

IMMOBILIZED-INTERFACE SOLUTE-TRANSFER APPARATUS

TECHNICAL FIELD

The present invention relates to a process for transferring solute from a liquid feed solution to a liquid extractant which is substantially immiscible with the feed solution.

BACKGROUND ART

Liquid-liquid extractions are often used in chemical processes to transfer a solute dissolved in a first liquid to a second liquid which is essentially immiscible with the first liquid. The solution of the solute in the first liquid is generally termed a feed solution and the second liquid is generally termed an extractant. The undissolved solute can be a solid, a liquid, or a gas. When the feed solution is brought into contact with the liquid extractant, the solute tends to distribute itself between the two liquids in accordance with the relative solubility of the solute in the two liquids. Since the feed solution and the liquid extractant are essentially immiscible, they form two distinct thermodynamic phases when in contact with one another. These two phases can be physically separated from one another, which effects a separation of a fraction of the solute from the feed solution.

In order to promote a rapid distribution of the solute between a feed solution and an extractant in conventional liquid-liquid extraction processes, the feed solution and the extractant are typically mixed together intimately. However, such intimate mixing frequently gives rise to troublesome problems. For example, the mixing generally involves forming a dispersion of one of the liquids in the other. Frequently, the resulting dispersion is relatively stable, so that it takes a long time for the dispersed liquid to coalesce. As a result, the throughput of the solute-transfer process is undesirably low or the inventory of feed solution and extractant tied up in the process is undesirably high.

U.S. Pat. No. 3,956,112 to Lee et al. refers to an extraction process in which a porous membrane serves as a partition between two immiscible solvents. Solutes from one solvent are transferred to the other solvent via direct solvent-solvent contact by way of the porous membrane. In practice, however, conventional extraction processes in which immiscible solvents are separated by a porous membrane generally do not prevent one solvent from forming a dispersion in the other. Typically one or the other solvent seeps through the porous membrane and becomes dispersed in the solvent on the other side of the membrane. As a result, conventional extraction processes involving immiscible solvents separated by a porous membrane generally must provide a settling tank and a solvent return mechanism to coalesce the dispersion formed by the seepage of one of the solvents through the membrane and to return the solvent thus recovered to its source.

DISCLOSURE OF THE INVENTION

I have invented a process for transferring solute from a liquid feed solution to a liquid extractant and an apparatus for carrying out liquid-liquid solute-transfer processes which avoids problems of the prior art noted above.

Broadly, the process of the invention involves transferring solute from a feed solution to a liquid extractant through a porous membrane. In an undissolved state, the solute may be a solid, a liquid, or a gas. The feed solution and the extractant, when in direct contact with each other, are essentially immiscible with each other.

The process of the invention includes the step of contacting a first side of the porous membrane with the feed solution containing the solute and contacting a second, opposing side of the membrane with the liquid extractant. The feed solution and the extractant can come into contact through the pores of the membrane. On the surface of the porous membrane, either the feed solution tends to displace the extractant or the extractant tends to displace the feed solution. The fluid which tends to displace the other defines a membrane-wetting liquid.

The process further includes the step of maintaining an interface-immobilizing pressure difference between the feed solution and the extractant. The interface-immobilizing pressure difference is imposed in a direction and a magnitude which is effective to substantially prevent the membrane-wetting liquid from flowing through the membrane and dispersing in the liquid on the opposite side of the membrane. The interface between the feed solution and the extractant is thereby effectively immobilized at the porous membrane.

The effective diameters of the pores of the porous membrane should be sufficiently large to permit a flow of the membrane-wetting liquid through the pores and sufficiently large to permit the solute to pass through the pores. The membrane should be mechanically strong enough—with suitable reinforcement, if necessary—to withstand the interface-immobilizing pressure difference imposed across the membrane under the intended operating conditions. In certain cases, the membrane material may swell in the presence of the feed solution or the extractant. So long as the swollen membrane remains strong enough to withstand the interface-immobilizing pressure difference, the swelling of the membrane should not be a disadvantage.

The interface-immobilizing pressure difference should be imposed in a direction to oppose the tendency of the membrane-wetting liquid to pass through the membrane. Thus a greater pressure is imposed on the liquid opposite to the membrane-wetting liquid than is imposed on the membrane-wetting liquid in order to oppose the tendency of the membrane-wetting liquid to pass through the membrane.

The range of differences in pressure effective to immobilize the interface between a particular feed solution and extractant at a particular porous membrane depends on a number of factors, including the relative tendency of the feed solution and the extractant to wet the membrane material, the interfacial tension between the feed solution and the extractant, the flow characteristics of each liquid at the surface of the membrane, and the effective diameters of the pores of the membrane. The minimum value of the pressure difference effective to immobilize the interface between the feed solution and the extractant at the porous membrane cannot in general be predicted a priori, largely because the formation of a dispersion depends strongly on the pattern of flow of the liquids at the surface of the membrane. As a practical matter, the average minimum pressure difference opposing the tendency of the membrane-wetting liquid to pass through the membrane should at least be greater than any pressure-difference fluctuations in the opposite direction which, for example, might be expected to be caused by pumping irregularities. In general, the smaller the pores of the membrane and the greater the interfacial tension between the feed solution and the extractant, the greater is the maximum pressure difference which is effective to immobilize the interface. Because of the number of factors involved, it is preferred to establish a range for the interface-immobilizing pressure difference experimentally for a particular porous membrane, feed solution and extractant. A pressure difference range of from about 5 kPa to about 620 kPa has been found to be suitable for certain applications, with the range of from about 140 kPa to about 410 kPa being particularily preferred.

A membrane solute transfer unit for carrying out solute-transfer processes such as the process of the invention includes a porous membrane located within a liquid-tight housing. The porous membrane divides the interior of the housing into two chambers: a feed solution chamber and an extractant chamber. Pores of the membrane provide communication between the two chambers. The housing is provided with inlet and outlet ports which permit feed solution to be introduced and discharged from the feed solution chamber and liquid extractant to be introduced and discharged from the extractant chamber.

The solute-transfer unit of the invention also includes a mechanism for controlling the difference between the liquid pressure of feed solution in the feed solution chamber and the liquid pressure of the extractant in the extractant chamber. The pressure difference is controlled so that it falls within a pressure range effective substantially to immobilize an interface between of the feed solution and the extractant at the porous membrane.

The porous membranes of the present invention may be hydrophilic or hydrophobic. Preferred hydrophilic membranes include porous regenerated cellulose, porous cellulose acetate, porous cellulose acetate-nitrate, porous cellulose triacetate, microporous glass, and porous procelain. Preferred hydrophobic membranes include porous polyethylene, porous polypropylene, and porous polytetrafluoroethylene (PTFE). The effective diameters of the pores of the membrane preferably lie in the range of from about 1 nm to about 10 $\mu$m. The porous membrane should be as thin as is consistent with the need to be strong enough to withstand the interface-immobilizing pressure difference applied across the membrane. Porous membranes from about 25 $\mu$m to about 125 $\mu$m in thickness are preferred.

For solute-transfer processes carried out on an industrial scale, it is preferred for the porous membrane to be in the form of hollow tubular fibers with porous walls. Bundles of large numbers of such tubular fibers can provide a high value for the ratio of the area of porous membrane through which the solute transfer occurs to the volume of the vessel which contains the feed solution/membrane/extractant system. It is ordinarily preferred for the liquid which preferentially wets the porous wall of the tubular fiber to be located within the lumen of the fiber, since in that case the interface-immobilizing pressure difference would be directed from the outside of the tubular fiber to the inside of the fiber, thereby tending to compress the tubular wall of the fiber. Generally, the walls of tubular fibers are stronger in compression than in tension. Preferably the walls of the tubular fibers are sufficiently thick relative to the diameter of the tube to permit the tube to withstand a compressive interface-immobilizing pressure difference without collapsing. When a liquid is caused to flow through a hollow tubular fiber, a significant pressure drop can occur between the inlet and outlet ends of the fiber. Care should be taken to ensure that an interface-immobilizing pressure difference is maintained across the porous wall of a hollow tubular fiber along the entire length of the fiber.

The present invention permits two or more solute-transfer processes to be carried out conveniently at the same time in a single vessel. For example, a preferred double-transfer solute-transfer unit includes a liquid-tight housing, the interior of which is divided by two porous membranes into a sequence of three side-by-side chambers. A feed solution could be pumped through a first end chamber. An intermediate chamber separated from the first end chamber by a first porous membrane could contain an intermediate extractant liquid substantially immisible with the feed solution. A second end chamber separated from the intermediate chamber by a second porous membrane could have pumped through it a back-extractant liquid which is immisible with the intermediate extractant. The back-extractant liquid could be completely miscible with the feed solution, if desired. Solute in the feed solution in the first chamber could be transferred to the intermediate extractant in the intermediate chamber through the first porous membrane. The solute could then diffuse through the intermediate extractant to the second porous membrane and then be transferred to the back extractant through the second membrane. The intermediate chamber preferably is as narrow as practical to minimize the diffusion path length and to minimize the inventory of intermediate extractant and solute held up in the intermediate chamber. A first interface-immobilizing pressure difference should be maintained across the first membrane to oppose the tendency of the feed solution or the intermediate extractant, as the case may be, to pass through the membrane. A second interface-immobilizing pressure diffeence should be maintained across the second membrane to oppose the tendency of the intermediate extractant or the back extractant, as the case may be, to pass through the membrane.

Alternatively, a feed solution could be pumped through the intermediate chamber of the preferred double-transfer solute-transfer unit discussed in the preceding paragraph. First and second extractant liquids, each immiscible with the feed solution, could be pumped through the first and second end chambers. An interface-immobilizing pressure difference should then be maintained across each of the first and the second porous membrane to oppose the tendency of one or the other of the feed solution or extractant liquid to pass through the membrane. By using two different extractant liquids, two different solutes could be extracted from a single feed solution at the same time.

For industrial scale solute-transfer processes involving two or more simultaneous solute transfers, it is preferred to employ a plurality of bundles of hollow tubular fibers with porous walls. For example, in the case of a process involving a solute transferred from a feed solution to a back extractant by way of an intermediate extractant which is substantially immiscible with both the feed solution and the back extractant, a preferred double-transfer extraction cell includes two bundles of hollow tubular fibers with porous walls passing through the interior of a liquid-tight housing. The feed solution is pumped through the first bundle of tubular fibers and the back extractant is pumped through the second bundle of tubular fibers. The intermediate extractant fills the interior of the housing, exterior of the tubular fibers. The fibers of the two bundles are preferably commingled and located close to one another to reduce the diffusion path length from the fibers containing the feed solution to the fibers containing the back extractant.

The mechanism for maintaining an interface-immobilizing pressure difference across a porous membrane in the process of the invention may be a closed-loop feed back-type pressure regulating system, if desired. A preferred closed-loop pressure regulating system would sense the liquid pressure on both sides of the porous membrane and control the fluid pressure on one side or the other to maintain the difference between the pressures to within a preset range. Alternatively, the mechanism for maintaining an interface-immobilizing pressure difference across the porous membrane could be an open loop pressure regulating system. In a preferred open-loop pressure regulating system, the liquid pressure on a first side of the membrane is maintained at a first preset value and a liquid pressure on the opposite side of the membrane is maintained at a second preset value essentially independently of the pressure on the first side. The two preset values are chosen so that the difference between the pressure on the two sides falls within a desired interface-immobilizing pressure range.

It is expected that the solute-transfer process of the invention will have wide utility in the chemical and pharmaceutical industries. In fermentation processes, for example, fermentation products can be continuously withdrawn from an aqueous fermentation broth as the fermentation proceeds by transfer to an organic solvent which is immiscible with water. Ethyl alcohol could be extracted from such a broth by a solvent such as dibutyl pthalate or tributyl phosphate separated from the broth by a membrane of porous polypropylene. Cellular debris and other particulate matter in the broth would be prevented from contaminating the solvent stream by the porous membrane. Antibiotics or other fermentation products could be extracted from the broth in an analogous manner with appropriate extractant liquids. Oxygen could be introduced into and carbon dioxide withdrawn from the fermentation broth using a gas-permeable membrane at the same time as fermentation products were being extracted using the process of the invention.

The process of the invention could also be used to separate phenol from waste water using MIBK or diisopropylether as an extractant. If the waste water contained hydrogen sulfide or ammonia in addition to phenol, the MIBK or diisopropylether extractant could be used to extract the phenol and the hydrogen sulfide or ammonia could be removed simultaneously using a gas-permeable membrane. Aromatics could be extracted from petroleum distillates using sulfolane or propylene carbonate as an extractant. Other applications of the solute-transfer process of the invention will occur to persons skilled in the art.

BRIEF DESCRIPTION OF THE DRAWINGS

Preferred membrane solute-transfer units of the invention are described below with reference to the following figures.

BEST MODE FOR CARRYING OUT THE INVENTION

Figure 1:
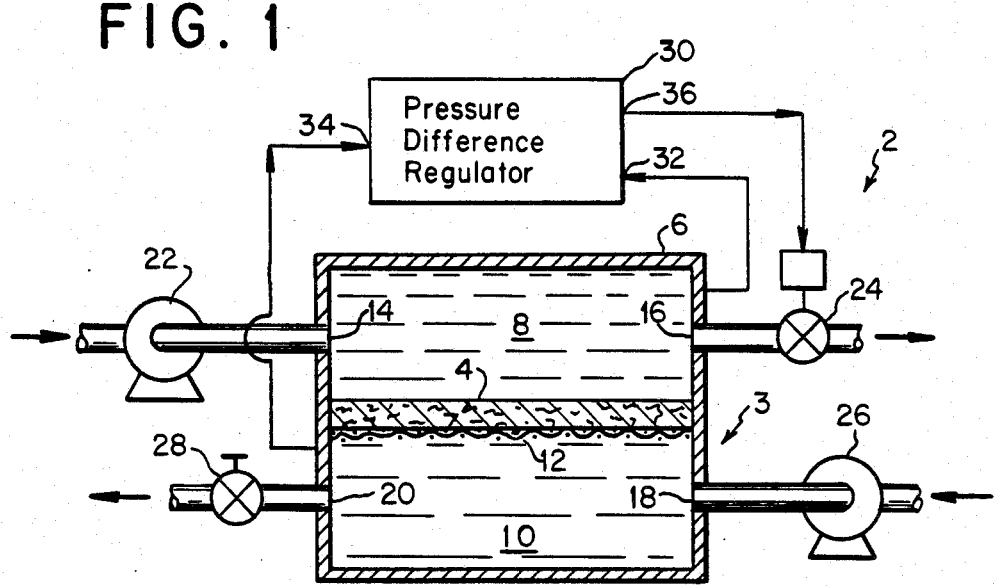
FIG. 1 is a schematic diagram of a first preferred membrane solute-transfer unit.

Turning now to FIG. 1, a membrane solute-transfer unit 2 includes an extraction cell 3 which has a porous membrane 4 located within a housing 6. The membrane 4 is sealed to the walls of the housing 6 and divides the interior of the housing into a feed solution chamber 8 and a liquid extractant chamber 10. Pores passing through the membrane 4 provide communication between the feed solution chamber 8 and the extractant chamber 10. A reinforcing screen 12 is adjacent to the porous membrane 4 on the side of the membrane facing the extractant chamber 10. The screen 12 provides mechanical support for the membrane 4.

A feed-solution inlet port 14 and a feed-solution outlet port 16 permits a feed solution to be introduced into and discharged from the feed solution chamber 8. A feed-solution pump 22 is connected to the feed-solution inlet port 14 and is capable of pumping feed solution at a substantially constant rate under pressure into the feed solution chamber 8. An electrically-controlled feed solution discharge throttle valve 24 is connected to the feed-solution outlet port 16 for controlling the liquid pressure of the feed solution flowing through the feed-solution chamber 8.

An extractant inlet port 18 and an extractant outlet port 20 permit a liquid extractant to be introduced into and discharged from the extractant chamber 10. An extractant pump 26 is connected to the extractant inlet port 18 and is capable of pumping the liquid extractant through the extractant chamber 10 at a substantially constant rate. An electrically-controlled extractant discharge throttle valve 28 is connected to the extractant outlet port 20 for controlling the liquid pressure of the extractant flowing through the extractant chamber 10.

A pressure-difference regulator 30 has a head pressure sensor input 32 in communication with the feed solution chamber 8 for sensing the liquid pressure of the feed solution in the chamber. A base pressure sensor input 34 communicates with the extractant chamber 10 for sensing the fluid pressure of the extractant in the chamber. A throttle valve control-signal output 36 of the pressure-difference regulator 30 is connected to the feed-solution discharge throttle valve 24. The pressure-difference regulator 30 generates a throttle valve control signal at the control signal output 36 which varies in response to changes in the difference between the pressure sensed at the head pressure sensor input 32 and the pressure sensed at the base pressure sensor input 34.

In operation, the feed solution is pumped by the feed solution pump through the feed-solution chamber 8 at a substantially constant rate. An extractant is pumped by the extractant pump 26 through the extractant chamber 10 at a substantially constant rate. The pressure difference regulator 30 senses the liquid pressure in the feed solution chamber 8 and in the extractant chamber 10 and generates a throttle valve control signal to control the pressure drop across the feed-solution discharge throttle valve 24 so that the difference between the liquid pressure in the feed-solution chamber 8 and the liquid pressure in the extractant chamber 10 is within a predetermined range which is effective substantially to immobilize the interface between the feed solution and the liquid extractant at the membrane 4. Solute from the feed solution is transferred through the pores of the membrane 4 to the extractant.

Figure 2:
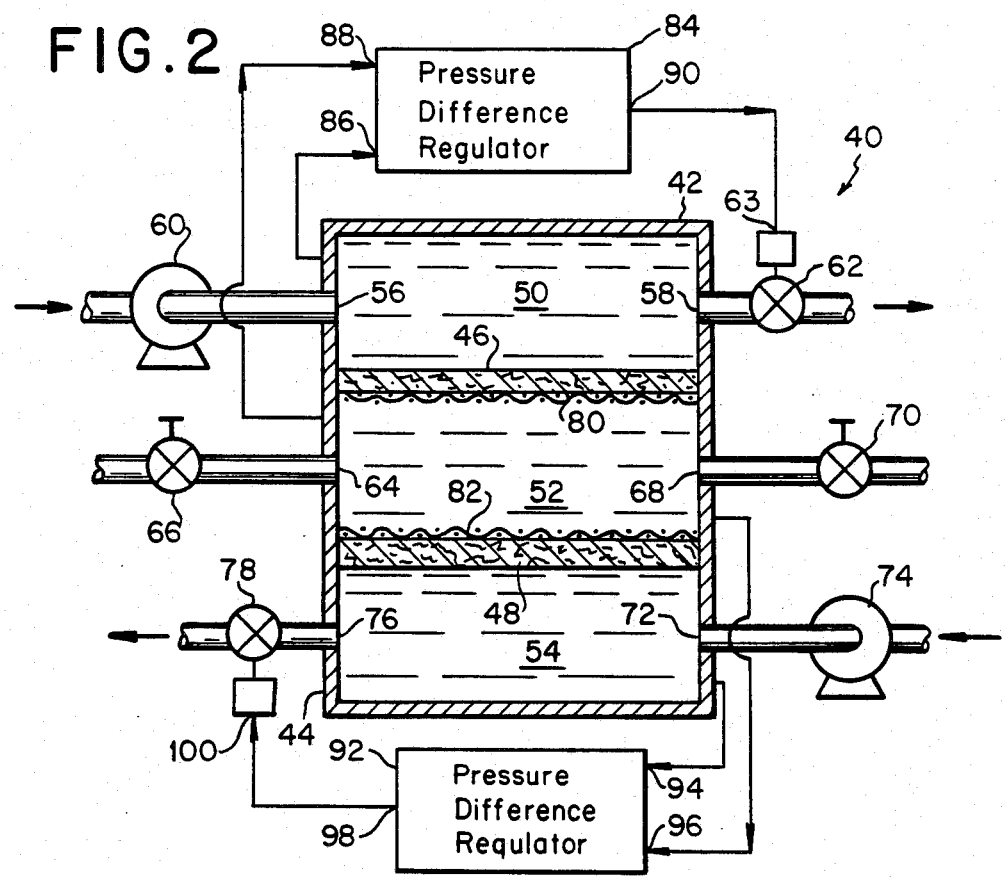
FIG. 2 is a schematic diagram of a second preferred membrane solute-transfer unit which employs an intermediate extractant.

Turning now to FIG. 2, a membrane solute-transfer unit 40 has a three-chamber extraction cell 42. The extraction cell 42 has a housing 44 and a first and a second porous membrane 46 and 48 located within the interior of the housing 44. The first and the second porous membranes 46 and 48 are sealed to the housing 44 and divide the housing into three chambers: a feed solution chamber 50, an intermediate-extractant chamber 52, and a back-extractant chamber 54. The intermediate-extractant chamber 52 is located between the feed-solution chamber 50 and the back-extractant chamber 54. Pores in the first porous membrane 46 provide communication between the feed-solution chamber 50 and the intermediate-extractant chamber 52; pores in the second porous membrane 48 provide communication between the back-extractant chamber 54 and the intermediate-extractant chamber 52.

The extraction cell housing 44 has a feed-solution inlet port 56 and a feed-solution outlet port 58 for respectively introducing a feed solution into and discharging the feed solution from the feed solution chamber 50. A feed-solution input pump 60 is connected to the feed solution inlet port 56 and an electrically-controlled feed-solution throttle valve 62 is connected to the feed solution discharge port 58. The extraction cell housing 44 has an intermediate-extractant inlet port 64 to which an intermediate-extractant inlet valve 66 is connected for introducing an intermediate extractant into the intermediate extractant chamber 52. The extractant cell housing 44 also includes an intermediate extractant outlet port 68 to which an intermediate-extractant outlet valve 70 is connected for discharging the intermediate extractant from the intermediate extractant chamber 52. The extractant cell housing 44 also has a back-extractant inlet port 72 to which a back-extractant inlet pump 74 is connected and a back extractant outlet port 76 to which an electrically-controlled back-extractant discharge throttle valve 78 is connected.

A first reinforcing screen 80 is located in the extractant cell housing 44 adjacent to the first porous membrane 46 facing the intermediate extractant chamber 52. A second reinforcing screen 82 is located in the extractant-cell housing 44 adjacent to the second porous membrane 48 facing the intermediate-extractant chamber 52.

A first pressure difference regulator 84 has a head pressure sensor input 86 which communicates with the feed solution chamber 50 and a base pressure sensor input 88 which communicates with the intermediate extractant chamber 52. A throttle-valve control output 90 of the first pressure difference regulator 84 is connected to a control signal input 63 of the feed-solution discharge throttle valve 62. The first pressure difference regulator 84 is capable of generating a valve control signal at the throttle valve control outlet 90 which varies in accordance with changes in the difference between the liquid pressure at the head pressure sensor input 86 and the liquid pressure at the base pressure sensor input 88. The pressure drop accross the throttle valve 62 and hence the liquid pressure in the feed-solution chamber 50 varies in response to changes in the valve control signal supplied to the control signal input 63 of the valve 62. As a result, the first pressure difference regulator 84 can control the difference in pressure between the feed-solution chamber 50 and the intermediate-extractant chamber 52.

A second pressure difference regulator 92 has a first pressure sensor input 94 which communicates with the back extractant chamber 54 and a base pressure sensor input 96 which communicates with the intermediate extractant chamber 52. A throttle valve control output 98 is connected to a control input 100 of the back-extractant discharge throttle valve 78. The operation of the second pressure difference regulator 92 is essentially the same as the operation of the first pressure difference regulator 84 with the result that the difference in liquid pressure between the back extractant chamber 54 and the intermediate extractant chamber 52 can be controlled by the second pressure difference regulator 92 to a preset value.

In operation, the feed solution is pumped by the feed-solution pump 60 at a substantially constant rate through the feed-solution chamber 50 and out through the feed-solution discharge throttle valve 62. The intermediate-extractant chamber 52 is filled with an intermediate extractant liquid which is substantially immiscible with the feed solution. The intermediate extractant in the intermediate extractant chamber 52 preferably remains essentially stagnant, although a trickle flow through the chamber may be maintained if the intermediate extractant degenerates with time. The back-extractant liquid is pumped through the back-extractant chamber 54 at a substantially constant rate by the back-extractant input pump 74 and discharged through the back-extractant discharge throttle valve 78.

In the three-chamber extractant cell of FIG. 2, the intermediate extractant wets the first and the second membranes 46 and 48 preferentially relative to the feed solution and the back extractant. Consequently, the pressure in the feed-solution chamber 50 and the back-extractant chamber 54 is maintained at a value greater than the pressure in the intermediate-extractant chamber 52 in order to oppose the tendency of the intermediate-extractant to flow through the porous membrane.

Solute in the feed solution is transferred through the pores of the first porous membrane 46 to the intermediate extractant in the intermediate extractant chamber 52. The solute then diffuses across the intermediate extractant chamber 52 and is transferred through the pores of the second porous membrane 48 to the back-extractant liquid in the back-extractant chamber 54. The solute in the back-extractant chamber 54 is then swept with the back-extractant out the chamber and collected.

Figure 3:
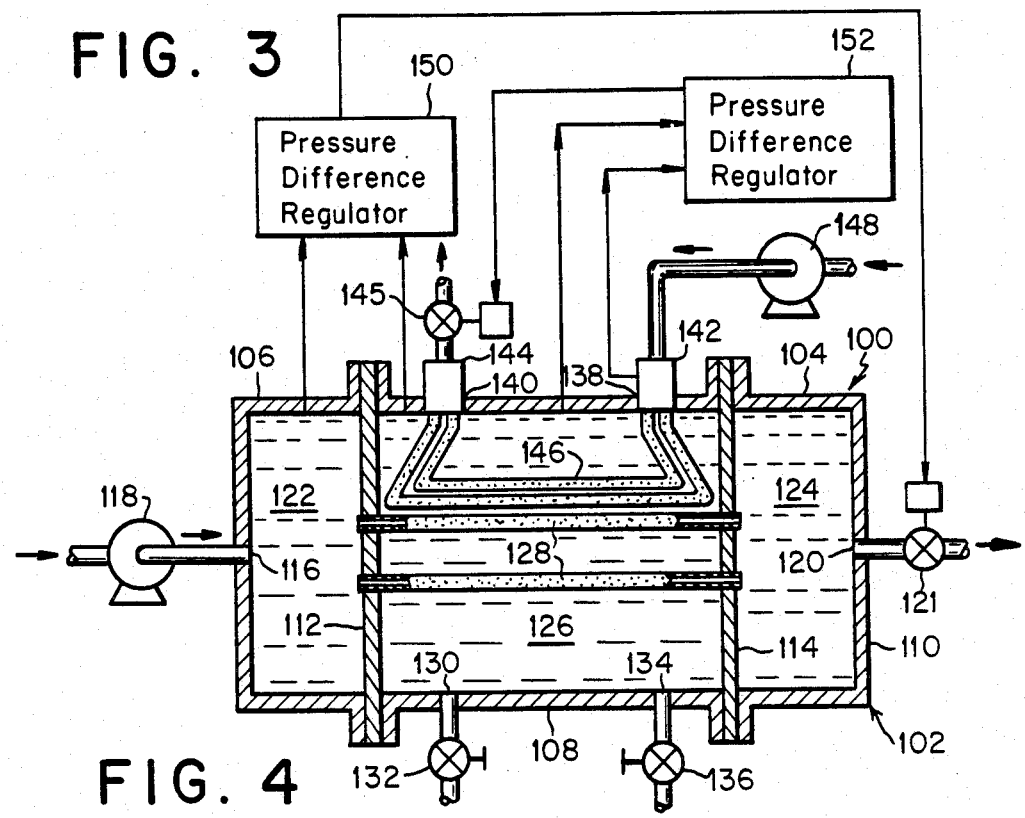
FIG. 3 is a schematic diagram of a third preferred membrane solute-transfer unit which employs porous membranes in the form of hollow tubes.

Turning now to FIG. 3, a solute transfer unit 100 includes an extraction cell 102. The extraction cell 102 includes a generally cylindrical pressure vessel 104 which serves as the housing for the extraction cell. The pressure vessel 104 is made up of a feed-solution input section 106, a solute transfer section 108 and a feed-solution output section 110. A feed-solution input patition 112 is located between the feed-solution input section 106 and the solute-transfer section 108. The volume enclosed by the feed solution input section 106 of the pressure vessel 104 and the input partition 112 defines a feed solution input manifold 122. A feed-solution output partition 114 is located between the solute-transfer section 108 and the feed solution output section 110. The volume enclosed by the feed-solution output section 110 of the pressure vessel 104 and the output partition 114 defines a feed-solution output manifold 124. The volume enclosed by the solute-transfer section 108 of the pressure vessel 104 and the input and output partitions 112 and 114 defines an intermediate extractant chamber 126.

The feed-solution input section 106 of the pressure vessel 104 has a feed solution input port 116 which is connected to a feed solution input pump 118 for pumping feed solution into the feed solution input manifold 122. The feed solution output section 110 has a feed-solution output port 120 to which an electrically-controlled feed-solution discharge throttle valve 121 is connected through which feed solution in the feed solution output manifold 124 can be discharged. A plurality of hollow feed-solution solute transfer tubes 128 extend from the feed-solution input manifold 122 to the feed-solution output manifold 124. The feed-solution solute-transfer tubes 128 pass through the input partition 112, extend across the intermediate-extractant chamber 126 and pass through the output bulkhead 114. The solute transfer tubes 128 are embedded in the partitions 112 and 114 by an epoxy adhesive. The hollow solute-transfer tubes 128 are made of porous polypropylene and have a wall thickness of about 18.5 $\mu$m and an inside diameter of about 0.25 mm.

The solute transfer section 108 of the pressure vessel 104 has an intermediate extractant inlet port 130 connected to an intermediate-extractant inlet valve 132 for introducing an intermediate-extractant into the intermediate extractant chamber 126. An intermediate extractant outlet port 134 connected to an intermediate outlet valve 136 is provided in the solute-transfer section 108 for discharging intermediate extractant from the intermediate-extractant chamber 126.

The solute transfer section 108 of the pressure vessel 104 has a back-extractant inlet port 138 and a final extractant outlet port 140 passing through it. Connected to the back-extractant inlet port 138 is a back-extracaant input manifold housing 142 the interior of which defines a final extractant input manifold (not shown).

A plurality of back-extractant solute-transfer tubes 146 extend from the back-extractant input manifold to the back-extractant output manifold. The back-extractant solute-transfer tubes 146 are made of the same porous polypropylene material as the feed-solution solute-transfer tubes 128. The back-extractant solute-transfer tubes 146 extend through the intermediate-extractant chamber 126 and intermingle with the feed-solution solute transfer tubes 128. The feed-solution solute transfer tubes 128 and the back-extractant solute-transfer tubes 146 are located close to one another to minimize the mean distance the solute must traverse in passing from the one set of tubes to the other. Comingled bundles of the feed-solution solute-transfer tubes 128 and the back-extractant solute-transfer tubes 146 can be prepared as follows. First, about 500 lengths of hollow tubular fiber are cut to substantially the same length to serve as the feed-solution solute-transfer tubes 128. The lengths of fibers are laid side-by-side on a flat surface. By weaving thread crosswise of the hollow tubular fibers in strips at other end, the fibers are bound together to form a flat mat. A similar mat is prepared with about 500 sections of hollow tubular fibers of a length suitable for the back-extractant solute-transfer tubes 146. The back-extractant solute-transfer fibers 146 are longer than the feed-solution solute transfer fibers 128 in the extraction cell 102. The mat of the fibers for the feed-solution solute-transfer fibers 128 is placed on top of the mat for the back-extractant solute-transfer fibers 146, with the fibers of each mat running essentially in parallel and with the shorter mat centered lengthwise on the longer mat. The two mats are then rolled up to form a cylinder with the fibers running generally parallel to the cylinder axis. The cylinder of fibers is then placed in the solute-transfer section 108 of the extraction cell 102. The woven strip of the shorter mat are then unravelled to free the ends of the shorter fibers. The ends of the longer fibers, which protrude from either end of the cylinder, are gathered into three or four bundles and brought out through the corresponding back-extractant input or output manifold. The four groups of ends of fibers are then potted separately in epoxy. Especially, the ends are immersed in a layer of liquid epoxy and hardened, which is allowed to cure. The epoxy blocks the openings of most of the hollow fibers. In order to reopen the openings in the fibers, a slice is cut from the epoxy. Depending on the nature of the fibers and the epoxy, the slice may be cut from the epoxy after it has fully cured or when it has only partially cured. The cured epoxy serves as the feed solution input and output partitions 112 and 114.

A back-extractant input pump 148 is connected to the back-extractant input fitting 142 for pumping a back-extractant liquid through the back-extractant solute transfer tubes 146.

A first pressure difference regulator 150 senses the pressure in the feed-solution input-manifold 122 and the intermediate extractant chamber 126 and controls the feed-solution discharge throttle valve 121 to maintain the difference between the pressure in the feed-solution input manifold and the pressure in the intermediate extractant chamber within a predetermined range. Similarly, a second pressure difference regulator 152 senses the pressure in the back-extractant input manifold and the intermediate extractant chamber 126 and controls the back-extractant discharge throttle valve 145 to maintain the difference in pressure between the back-extractant input manifold and the intermediate extractant chamber 126 within a predetermined range.

In operation, the feed-solution input pump 118 pumps a feed solution at a substantially constant rate into the feed-solution input manifold 122, through the feed-solution solute-transfer tubes 128, and into the feed-solution output manifold 124 where it is discharged through the feed solution discharge throttle valve 121. The back-extractant input pump 148 pumps a back-extractant liquid at a substantially constant rate into the back-extractant input manifold, through the back-extractant solute-transfer tubes 146, and into the back-extractant output manifold, from which it is discharged through the back-extractant discharge throttle valve 145.

The pressure difference between the feed solution and the intermediate extractant is maintained by the first pressure difference regulator 150 in a range which substantially immobilizes the interface between the feed solution and the intermediate extractant at the porous walls of feed-solution solute-transfer tubes 128. Similarly, the pressure difference between the back extractant and the intermediate extractant is regulated by the second pressure difference regulator 152 to fall within a range which substantially immobilizes the interface between the back extractant and the intermediate extractant at the porous walls of the back-extractant solute transfer tubes 146.

Solute in the feed solution is transferred through the porous walls of the feed solution solute-transfer tubes 128 to the intermediate extractant in the intermediate extractant chamber 126 and thence through the porous walls of the back extractant solute-transfer tubes 146 to the back-extractant flowing in the transfer tubes 146. The back extractant in which the solute is dissolved is collected from the output of the back-extractant discharge throttle valve 145.

Figure 4:
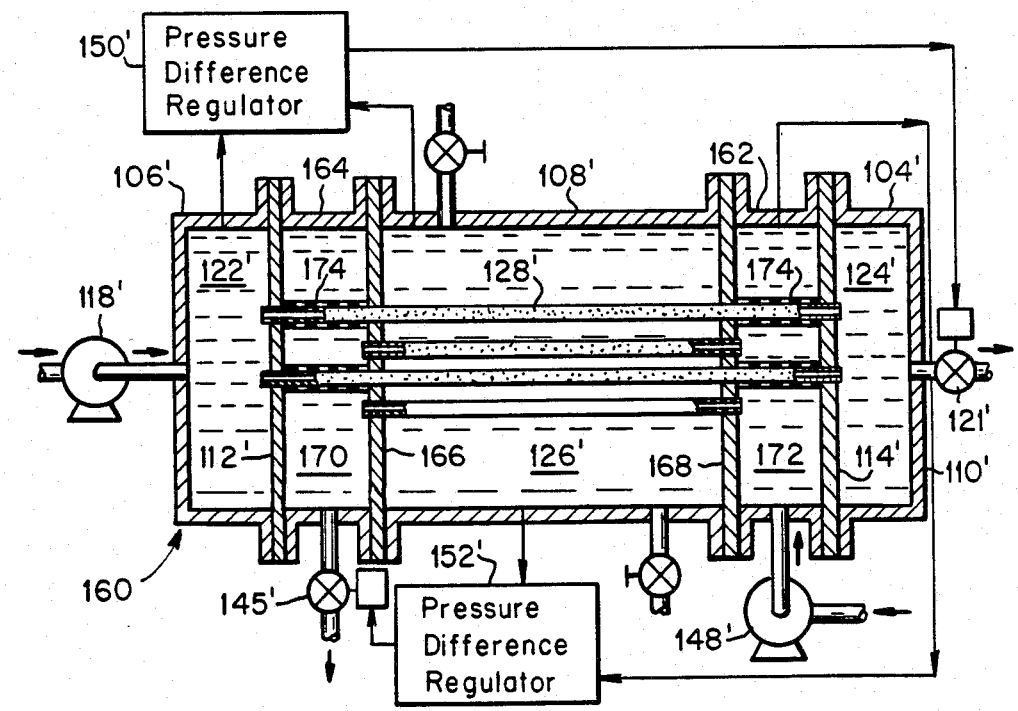
FIG. 4 is a schematic diagram of a fourth preferred membrane solute-transfer unit which employs porous membranes in the form of hollow tubes.

FIG. 4 illustrates a fourth solute-transfer unit 160 which is generally similar to the third solute-transfer unit 100 described above. For conciseness, only those features of the fourth solute transfer unit 160 which differ from the third solute transfer unit 100 will be discussed below. Corresponding parts in the third and fourth solute-transfer units 100 and 160 are given corresponding reference numerals.

The pressure vessel 104' which serves as a housing for the extraction unit 160 includes a back-extractant input section 162 which is located between the feed solution output section 110' and the solute-transfer section 108' of the pressure vessel. A back-extractant output section 164 is located between the feed-solution input section 106' and the solute-transfer section 108'. The feed-solution input partition 112' is located between the feed-solution input section 106' and the back-extractant output section 164. A first intermediate partition 166 is located between the back-extractant output section 164 and the solute transfer section 108'. The volume enclosed by the back-extractant output section 164, the feed-solution input partition 112', and the first intermediate bulkhead 166 defines a extractant output manifold 170.

The feed-solution output partition 114' is located between the back-extractant input section 162 and the feed-solution output section 104'. A second intermediate partition 168 is located between the back-extractant input section 162 and the solute-transfer section 108'. The volume enclosed by the back-extractant input section 162, the feed-solution output partition 114 and the second intermediate partition 168 defines a back-extractant input manifold 172.

The feed-solution solute-transfer tubes 128' extend from the feed-solution input manifold 122' to the feed-solution output manifold 124'. Each feed-solution solute-transfer tube 128' passes through, in turn: the feed-solution input partition 112', the back-extractant output manifold 170, the first intermediate partition 166, the intermediate-extractant chamber 126', the second intermediate partition 168, the back-extractant manifold 172 and the feed-solution output partition 114'. A non-porous sheath 174 surrounds each fed solution solute transfer tube 128 in the back-extractant input manifold 172 and output manifold 170 to prevent the feed solution and the back-extractant from mixing.

EXAMPLES

The following solute-transfer unit was used in the Examples set forth below.

An immobilized-interface extraction cell had a housing consisting of a first and a second generally disk-shaped block of stainless steel. The extraction-cell housing blocks were about 6.4 cm in diameter and about 2.2 cm thick. A generally disk-shaped depression was milled in one face of each block to define a liquid chamber which served as either the extractant chamber or the feed-solution chamber of the extraction cell. The liquid-chamber depressions were approximately 0.25 mm deep and approximately 3.7 cm in diameter.

Each extraction-cell housing block had two channels passing through it to serve as liquid inlet and outlet channels. Each channel consisted of a hole which extended radially inward from a side of the block at approximately the midplane of the block and connecting with seven holes extending axially from the midplane to the base of the liquid-chamber depression. The openings of the seven holes for each channel were disposed along a radius of the disk-shaped liquid-chamber depression from about 0.5 cm from the center of the depression to about 1.6 cm from the center. The radius along which the seven openings of one channel were located extended in generally the opposite direction from the radius along which the seven openings of the other channel were located. The use of seven openings into the liquid-chamber depression permitted liquid to be introduced into and withdrawn from the chamber at linear velocities not substantially higher than the linear velocities of the liquid passing through the chamber.

Two substantially circular grooves for two O-ring seals were cut in the face of the first extraction cell housing block substantially concentric with one another and encircling the liquid-chamber depression in the face. The radially inner groove was about 4.1 cm in diameter and the radially outer groove was about 5.0 cm in diameter.

Porous membranes for the extraction cell were in the form of disks about 4.8 cm in diameter cut from sheets of porous-membrane material. The diameter of the porous membrane disks was greater than the diameter of the inner O-ring seal but less than the diameter of the outer O-ring seal. The porous membrane disks were made of a number of different materials, which are identified in the various examples set forth below.

A circular disk of porous stainless-steel screening about 3.7 cm in diameter and about 0.3 mm thick was cut from a sheet of screening available under the trade name "Rigimesh, Grade Z" from Pall Trinity Corporation of Cortland, New York. The disk of screening was just large enough to fit within a depression on the face of a housing block. The disk of screening provided mechanical support for the porous membrane.

The extraction cell was assembled by placing O-ring seals in the O-ring seal grooves of the first extraction cell housing block and placing the disk of screening in the liquid-chamber depression in the face of the second housing block. The porous membrane disk was placed over the mouth of the depression on the second housing block on top of the disk of screening in substantially coaxial alignment with the depression. The two extraction cell housing blocks were then clamped together in substantially coaxial alignment with the faces of the blocks having liquid-chamber depressions facing one another. The radially inner O-ring seal held the porous membrane disk in place, and the radially outer O-ring seal formed a liquid-tight seal between the two housing blocks.

The two housing blocks were oriented azimuthally relative to one another so that an inlet to the liquid chamber of the first housing block was substantially aligned with an outlet of the liquid chamber in the second housing block, and an outlet to the liquid chamber of the first housing block was substantially aligned with an inlet of the liquid chamber in the second housing block. Consequently, liquid flowing from the inlet to the outlet in the two liquid chambers flowed in generally opposing directions to one another.

Two stainless-steel pressure vessels served as reservoirs for the feed solution and the extractant, respectively. Each pressure vessel was connected to an inlet port of one of the liquid chambers of the extractant cell via a pressure line. An adjustable throttle valve was connected to the outlet port for each liquid chamber. A source of compressed air was connected to each pressure vessel across a pressure regulating valve for pressurizing the contents of the pressure vessel to a pressure set by the valve. Pressurizing liquid contained in a pressure vessel to a value above ambient atmospheric pressure caused it to flow under pressure through the liquid chamber connected to the pressure vessel and then from the liquid chamber through the throttle valve to be discharged. The throttle valve was adjusted so that the resistance to flow imposed by the valve was substantially greater than the resistance to flow in the liquid path from the pressure vessel to the throttle valve. Consequently, essentially all of the pressure drop between the pressure in the pressure vessel and the ambient atmospheric pressure at the discharge outlet of the throttle valve occurred across the throttle valve. As a result, the pressure in the liquid chamber was substantially the same as the pressure impressed on the liquid in the pressure vessel by the compressed air. Thus, if the pressure in one pressure vessel differed from the pressure in the second pressure vessel by a selected amount, the pressure in the two fluid chambers connected respectively to the two pressure vessels differed by essentially the same amount.

The disk of screening in the liquid-chamber depression in the face of the second housing block supported the porous membrane clamped between the two housing blocks against a pressure difference directed from the liquid chamber in the first housing block to the fluid chamber in the second housing block. In other words, the screening supported the porous membrane if the pressure in the fluid chamber adjacent to the side of the porous membrane against which the screening was located was less than the pressure on the opposite side of the membrane. Consequently, the liquid which preferentially wet the porous membrane was caused to flow through the liquid chamber which contained the screening.

EXAMPLE 1

A feed solution of acetic acid in water was prepared from reagent grade glacial acetic acid and distilled water. The concentration of acetic acid in the feed solution was found to be about $5.6 \times 10^{-4}$ gmol/ml by titrating an aliquot of the solution with a standard NaOH solution.

A disk of porous polypropylene film 4.8 cm in diameter was cut from a sheet of the film. The film was approximately 25 μm thick and had an effective pore diameter of about 20 nm. The porosity of the film was about 0.38. The film is available under the trade name "Celgard 2400" from Celanese Corporation of Summit, N.J.

The disk of porous polypropylene was mounted between the two extraction-cell housing blocks as described above. The pressure vessel connected to the second extraction-cell housing block which contained the disk of screening was charged with pure xylene of ACS grade. The pressure vessel connected to the first housing block was charged with the aqueous acetic acid feed solution.

The first pressure vessel was then pressurized to a pressure just slightly above ambient atmospheric pressure. The throttle valve connected to the outlet of the second housing block was adjusted so that the volume flow rate of xylene though the extraction cell was about 20 cm$^3$/min.

The second pressure vessel was then charged to a pressure of about 280 kPa above ambient atmospheric pressure. The throttle valve connected to the outlet of the first extraction-cell housing block was adjusted so that the volume flow rate of the aqueous acetic acid feed solution through the extraction cell was about 20 cm$^3$/min.

Both the aqueous feed solution and the xylene were about 25° C. upon passing through the extraction cell.

Initially the aqueous solution discharged from the extraction cell was observed to contain droplets of a xylene phase. However, after several minutes a steady state was reached in which no organic liquid was observed in the aqueous solution discharged from the extraction cell and no aqueous liquid was observed in the xylene phase discharged from the cell.

An aliquot of the xylene phase discharged from the extraction cell was collected after the steady state was reached and analyzed for acetic acid content by titrating with a standard NaOH solution. The xylene was found to contain $4.66 \times 10^{-7}$ gmol/ml acetic acid.

For comparison, if equal volumes of the aqueous acetic acid feed solution and xylene were mixed together and allowed to equilibrate at 25° C., the xylene phase would be expected to contain about $6.6 \times 10^{-6}$ gmol/ml of acetic acid at equilibrium. This equilibrium concentration of acetic acid in xylene was calculated using a distribution coefficient of about 0.012 measured for acetic acid in water and xylene at about 25° C. over a concentration range of acetic acid in xylene which includes the concentration calculated here.

After the steady state conditions have been reached in the extraction cell, the quantity of acetic acid transferred across a unit area of the porous membrane from the aqueous feed solution to the xylene solution per unit time can be measured by collecting the xylene solution discharged from the cell for a given length of time, analyzing the solution collected for total acetic acid content, and dividing the quantity of acetic acid so found by the collection time and by the area of the porous membrane accessable to the feed solution and the xylene. The resulting value for the rate of solute transfer, denoted W, has the units gmol acetic acid/cm$^2$ sec. The rate of solute transfer W can be related to a transfer coefficient $K_o$, which characterizes the porous membrane of the extraction cell. Specifically, the transfer coefficient $K_o$ is defined by the equation $$W = K_o A (m\, C_{fs} - C_e)$$

where:
  W is the rate of solute transfer defined above.
  A is the area of the porous membrane contacted by the feed solution and extractant in the extraction cell. In the present extraction cell, the area A has a value of 13.37 cm$^2$.
  M is the equilibrium distribution coefficient of acetic acid in water and xylene at the concentration of acetic acid in water discharged from the extraction cell and at the temperature of the extraction.
  $C_{fs}$ is the concentration of acetic acid in the aqueous feed solution at the inlet to the extraction cell.
  $C_e$ is the concentration of the acetic acid in the xylene discharged from the extraction cell. In the present example, the transfer coefficient $K_o$ was found to be about $17.3 \times 10^{-4}$ cm/sec

EXAMPLE 2

The procedure of Example 1 was repeated with the following differences. The porous membrane was a porous polypropylene film having an effective pore diameter of about 40 nm, a thickness of about 25 μm, and a porosity of about 0.45. The porous polypropylene film is available under the trade name "Celgard 2500" from Calanese Corporation of Summit, N.J.

The feed solution was a solution of acetic acid in water with an acetic acid concentration of $4.2 \times 10^{-4}$ gmol/ml. The extractant was xylene.

The pressure vessel charged with xylene was pressurized to a pressure above ambient atmospheric pressure just great enough to cause a flow rate of about 32 ml/min of xylene through the extraction cell. The pressure and flow rate of the aqueous feed solution were substantially the same as Example 1.

After the steady state was reached essentially no droplets of a xylene phase were observed in the aqueous solution discharged from the extraction cell and no droplets of a water phase were observed in the xylene solution discharged from the extraction cell.

The concentration of acetic acid in the xylene discharged from the extraction cell after a steady state was reached was found to be about $2.54 \times 10^{-7}$ gmol/ml. The solute transfer coefficient $K_o$ for the membrane was about $19.7 \times 10^{-4}$ cm/sec.

EXAMPLE 3

The procedure of Example 1 was repeated with the exceptions noted below.

A porous membrane of porous polytetrafluoroethylene (PTFE) was used. The porous PTFE had an effective pore diameter of about 20 nm, a thickness of about 50 μm, a porosity of about 0.50, and a minimum pressure for water entry of about 2.4 MPa. The porous PTFE film was available under the trade name "Goretex" from W. L. Gore and Associates of Elton, Md.

The feed solution was a solution of acetic acid in water having an acetic acid concentration of about $4.2 \times 10^{-4}$ gmol/ml. The extractant was xylene. The flow rate of xylene through the extraction cell was about 50 ml/min and the pressure of the xylene was only slightly above ambient atmospheric pressure. The flow rate of the aqueous feed solution was about 22 ml/min and the pressure was about 69 kPa above ambient atmospheric pressure.

After a steady state was reached, essentially no droplets of a xylene phase were observed in the aqueous solution discharged from the extraction cell and essentially no droplets of a water phase were observed in the xylene solution discharged from the extraction cell.

The concentration of acetic acid in the xylene discharged from the extraction cell after a steady stake was reached was found to be about $1.2 \times 10^{-7}$ gmol/ml.

The solute transfer coefficient $K_o$ was about $14.9 \times 10^{-4}$ cm/sec.

EXAMPLE 4

The procedure of Example 1 was repeated with the following exceptions.

The porous membrane was porous PTFE having an effective pore diameter of about 200 nm, a thickness of about 63 μm, a porosity of about 0.78 and a minimum pressure for water entry of about 280 kPa. The porous film had a backing of nonwoven polyester fabric. The film was available under the trade name "Goretex" from W. L. Gore and Associates of Elton, Md.

The feed solution used was acetic aced in water having an acetic acid concentration of about $4.2 \times 10^{-4}$ gmol/ml. The extractant was pure xylene. The volume flow rate of the xylene through the extraction all was about 28 ml/min The pressure of the xylene was only slightly greater than ambient atmospheric pressure. The volume flow rate of the aqueous feed solution through the extraction cell was about 20 ml/min. The pressure on the feed solution was about 110 kPa above ambient atmospheric pressure.

After a steady state was reached, essentially no droplets of a xylene phase were observed in the aqueous solution discharged from the extraction cell and essentially no droplets of a water phase were observed in the xylene solution discharged from the extraction cell.

The concentration of acetic acid in the xylene solution discharged from the extraction cell after a steady state was achieved was found to be about $4.12 \times 10^{-7}$ gmol/ml. The solute transfer coefficient $K_o$ was found to be about $28 \times 10^{-4}$ cm/sec.

EXAMPLE 5

The procedure of Example 1 was repeated with the following exceptions.

A hydrophilic porous membrane of porous cellulose acetate was used. The porous membrane had an effective pore diameter of about 200 nm and a thickness of about 130 μm. The porous membrane was available under the trade name "Milipore EG" from Milipore Corporation at Bedford, Mass.

A feed solution of acetic acid in water with an acetic acid concentration of about $4 \times 10^{-4}$ gmol/ml was used. The extractant was pure xylene.

The xylene had a volume flow rate of about 60 ml/min and a pressure of about 55 kPa above ambient atmospheric pressure.

The feed solution had a volume flow rate of about 30 ml/min and a pressure of only slightly above ambient atmospheric pressure. The feed solution was directed through the fluid-chamber depression of the second extraction cell housing block, which contained the disk of screening for support. The aqueous feed solution was introduced into the extraction cell before the xylene in order to allow the feed solution to wet the hydrophilic membrane.

After a steady state was reached, essentially no droplets of a xylene phase were observed in the aqueous solution discharged from the extraction cell and essentially no droplets of a water phase were observed in the xylene solution discharged from the extraction cell.

The concentration of the acetic acid in the xylene solution discharged from the extraction cell after a steady state was achieved was found to be about $1.6 \times 10^{-7}$ gmol/ml The solute transfer coefficient $K_o$ was found to be about $24 \times 10^{-4}$ cm/sec.

EXAMPLE 6

The procedure of example 1 was followed with the following exceptions.

The porous membrane of example 1 and the feed solution of example 2 were used. The extractant was methylisobutylketone (MIBK).

The volume flow rate of the MIBK through the extraction cell was about 22 ml/min. The pressure of the MIBK extractant was only slightly above ambient atmospheric pressure. The volume flow rate of the feed solution was about 33 ml/min and the pressure of the feed solution was about 140 kPa above ambient atmospheric pressure.

After a steady state was reached, essentially no droplets of an MIBK phase were observed in the aqueous solution discharged from the extraction cell and essentially no droplets of a water phase were observed in the MIBK solution discharged from the extraction cell.

The concentration of acetic acid in the MIBK solution discharged from the extraction cell after a steady state was achieved was found to be about $3.9 \times 10^{-6}$ gmol/ml. The solute transfer coefficient $K_o$ was found to be about $5 \times 10^{-4}$ cm/sec.

The results of example 1-6 are summarized in the following Table I which follows.

It is not intended to limit the present invention to the specific embodiments disclosed above. It is recognized that changes may be made in the processes and apparatus specifically described herein without departing from the scope and teachings of the instant invention. For example, the screens 80 and 82 in the extraction cell 42 of FIG. 2 can be placed on the opposite side of the membranes if the feed solution and the back extractant preferentially wet the membranes 46 and 48. It is intended to encompass all other embodiments, alternatives and modifications consistent with the present invention.

extractant outlet port which communicate with the extractant chamber;

(c) pressure difference control means for maintaining a difference between a liquid pressure of a feed solution in the feed solution chamber and a liquid pressure of an extractant in the extractant chamber substantially within a predetermined pressure range so that an interface between the feed solution and the extractant is substantially immobilized at the membrane, to effectively prevent the formation of a dispersion of feed solution and extractant in either chamber on opposing sides of the membrane.

2. The membrane solute-transfer unit according to claim 1 in which the porous membrane is in the shape of a hollow tube, the interior of the tube defining one of the feed solution chamber and the extractant chamber.

3. The membrane separation unit according to claim 1 in which the porous membrane is composed of a hydrophilic material selected from the group consisting of porous regenerated cellulose, porous cellulose acetate, porous cellulose acetate-nitrate, porous cellulose triacetate, microporous glass and porous porcelain.

4. The membrane separation unit according to claim 1 in which the porous membrane is composed of a hydrophobic material selected from the group consisting of porous polyethylene, porous polypropylene and porous polytetrafluoroethylene.

TABLE I

| | | Extraction of Acetic Acid from Water into an Organic Extractant | | | | | | | |
|---|---|---|---|---|---|---|---|---|---|
| | | Feed Solution | | | Extractant | | | | Solute |
| Example No. | Membrane Polymer Pore size (μm) Thickness (μm) | Inlet HAc Conc. (gmol/cm³) × $10^{-4}$ | Flow Rate (cm³/min) | Pressure (kPa) | Compound | Outlet HAc Conc. (gmol/cm³) × $10^{-7}$ | Flow Rate (cm³/min) | Pressure (kPa) | Transfer Coef. (cm/sec) × $10^{-4}$ |
| 1. | Polypropylene 0.02 25 | 5.6 | 20 | 280 | xylene | 4.66 | 20 | 0+ | 17.3 |
| 2. | Polypropylene 0.04 25 | 4.2 | 20 | 280 | xylene | 2.54 | 32 | 0+ | 19.7 |
| 3. | PTFE, 0.04 50 | 4.2 | 22 | 59 | xylene | 1.23 | 50 | 0+ | 14.9 |
| 4. | PTFE*, 0.2 63 | 4.2 | 20 | 110 | xylene | 4.12 | 28 | 0+ | 28.0 |
| 5. | Cellulose Acetate 0.2 130 | 4.0 | 30 | 0+ | xylene | 1.60 | 60 | 55 | 24.0 |
| 6. | Polypropylene 0.02 25 | 4.2 | 33 | 140 | MIBK | 39.0 | 22 | 0+ | 5.00 |

*Backing of nonwoven polyester fibers

I claim:

1. An immobilized-interface solute-transfer unit for transferring a solute from a feed solution to an extractant liquid, the solute-transfer unit comprising:
   (a) a fluid-tight housing;
   (b) a porous membrane located in and connected to the housing, the porous membrane including pores having effective pore diameters in the range of from about 7 nm to about 10 μm, the porous membrane being preferentially wettable by one of the feed-solution and liquid extractant, the porous membrane dividing the housing into a feed solution chamber and an extractant chamber, the housing having a feed solution inlet port and a feed solution outlet port which communicate with the feed solution chamber and an extractant inlet port and an 5. The membrane-separation unit according to claim 1 in which the porous membrane is approximately planar in shape and the unit further comprises:
   (d) a membrane reinforcing screen connected to the housing and located adjacent to the porous membrane on a side of the membrane facing a chamber maintained in operation at a pressure lower than the pressure of the chamber on the opposing side of the membrane.

6. The membrane separation unit according to claim 1 in which the pressure difference control means includes:
   (c.1) a feed-solution pressure sensor in communication with the feed-solution chamber for detecting a liquid pressure in the chamber;

(c.2) an extractant pressure sensor in communication with the extractant chamber for detecting a liquid pressure in the chamber;

(c.3) a pressure-difference regulator having a head pressure-sensor input, a base pressure-sensor input and a control signal output, the head pressure-sensor input being connected to one of the feed-solution pressure sensor and the extractant pressure sensor and the base pressue-sensor input being connected to the other of the feed-solution pressure sensor and the extractant pressure sensor, the pressure-difference regulator being adapted to generate a pressure control signal at the control-signal output which varies in response to changes in the difference between the pressure sensed at the head pressure-sensor input and the base pressure-sensor input; and (c.4) a pressure control valve having a valve control input connected to the control-signal output of the pressure-difference regulator, the pressure control valve being in fluid communication with one of the feed solutiion chamber and the extractant chamber and being adapted to change the liquid pressure in the chamber with which it communicates in response to changes in a control signal at the valve control input.

7. The immobilized-interface solute-transfer unit according to claim 1 in which the extractant inlet port is connected to a source of extractant liquid.

8. A membrane solute-transfer unit for transferring solute from a liquid feed solution to a liquid extractant, the solute-transfer unit comprising:

(a) a solute-transfer unit housing having feed-solution inlet port means for introducing a feed solution into an interior of the housing and feed solution outlet port means for discharging the feed solution from the interior of the housing, the housing having extractant inlet and outlet port means for introducing and discharging an extractant from the interior of the housing;

(b) a plurality of hollow solute-transfer tubes, the solute-transfer tubes extending through the interior of the solute-transfer unit housing from the feed-solution inlet port means to the feed-solution outlet port means, the walls of the tubes being made of a porous membrane material, the porous membrane material including pores having effective pore diameters in the range of from about 7 nm to about 10 μm, the porous membrane material being preferentialy wettable by one of the feed-solution and liquid extractant interiors of the tubes communicating at an inlet end with the feed-solution inlet port means for receiving the feed-solution and at an outlet end with the feed solution outlet port means for discharging the feed solution; and (c) pressure difference control means for maintaining a difference between a liquid pressure of a feed solution in the interior of the solute-transfer tubes and a liquid pressure of an extractant in the interior of the separation unit housing exterior of the solute-transfer tubes substantially within a predetermined pressure range so that an interface between the feed solution and the extractant is substantially immobilized at the porous membrane wall of the solute-transfer tubes to effectively prevent the formation of a dispersion of feed solution and extractant in either the interior of the solute-transfer tubes or in the interior of the separation unit housing exterior of the solute-transfer tubes.

9. The membrane solute-transfer unit according to claim 8 in which the extractant inlet and outlet port means in connected to a source of liquid extractant.

10. A membrane solute-transfer unit for transferring solute from a liquid feed solution to a liquid extractant, the solute-transfer unit comprising:

(a) a solute-transfer unit housing having extractant inlet port means for introducing a liquid extractant into an interior of the housing and extractant outlet port means for discharging the extractant from the interior of the housing, the housing having feed-solution inlet and outlet port means for introducing and discharging a feed solution from the interior of the housing;

(b) a plurality of hollow solute-transfer tubes, the solute-transfer tubes extending through the interior of the solute-transfer unit housing from the extractant inlet port means to the extractant outlet port means, the walls of the tubes being made of a porous membrane material, the porous membrane material including pores having effective pore diameters in the range of from about 7 nm to about 10 μm, the porous membrane material being preferentially wettable by one of the feed-solution and liquid extractant interiors of the tubes communicating at an inlet end with the extractant inlet port means for receiving the liquid extractant and at an outlet end with the extractant outlet port means for discharging the extractant; and (c) pressure difference control means for maintaining a difference between a liquid pressure of the extractant in the interior of the solute-transfer tubes and a liquid pressure of the feed solution in the interior of the separation unit housing exterior of the solute-transfer tubes substantially within a predetermined pressure range so that an interface between the feed solution and the extractant is substantially immobilized at the porous membrane wall of the solute-transfer tubes to effectively prevent the formation of a dispersion of feed solution and extractant in either the interior of the solute-transfer tubes or in the interior of the separation unit housing exterior of the solute-transfer tubes.

11. The membrane solute-transfer unit according to claim 7 in which the pores of the porous membrane material of the solute-transfer tubes are of a size substantially to prevent cellular debris in a feed solution from passing from the feed solution exterior of the solute-transfer tubes to the interior of the solute-transfer tubes, and the solue-transfer unit further comprises:

(d) gas-permeable membrane means for introducing oxygen into the feed solution in the interior of the separation-unit housing.

12. The membrane solute-transfer unit according to claim 10 in which the extractant inlet port means is connected to a source of liquid extractant.

13. An immobilized-interface solute-transfer unit for transferring a solute from a feed solution to an extractant liquid, the solute-transfer unit comprising:

(a) A fluid-tight housing;

(b) a first porous membrane located in and connected to the housing, the first porous membrane being preferentially wettable by one of the feed solution and the extractant liquid, the first porous membrane dividing the housing into a feed solution chamber and an extractant chamber, the housing having a feed solution inlet port and a feed solution outlet port which communicate with the feed solution chamber and an extractant inlet port and an extractant outlet port which communicate with the extractant chamber;

(c) feed-solution/extractant pressure difference control means for maintaining a difference between a liquid pressure of a feed solution in the feed solution chamber and a liquid pressure of an extractant in the extractant chamber substantially within a predetermined pressure range so that an interface between the feed solution and the extractant is substantially immobilized at the first porous membrane to effectively prevent the formation of a dispersion of feed solution and extractant in either chamber on opposing sides of the membrane;

(d) a second porous membrane located in and connected to the housing the second porous membrane being preferentially wettable by one of the extractant liquid and a back-extractant, the second porous membrane being located in the extractant chamber and dividing the chamber into an intermediate extractant subchamber and a back extractant subchamber, the extractant inlet and outlet ports being in communication with the intermediate extractant subchamber, the housing having a back extractant inlet port and a back extractant outlet port which communicate with the back extractant subchamber; and (e) back-extractant/extractant pressure difference control means for maintaining a difference between a liquid pressure of a back extractant in the back extractant subchamber and a liquid pressure of an intermediate extractant in the intermediate extractant subchamber substantially within a predetermined pressure range so that the interface between the back extractant and the intermediate extractant is substantially immobilized at the second porous membrane to effectively prevent the formation of a dispersion of back-extractant and extractant in either subchamber on opposing sides of the second porous membrane.

14. The immobilized-interface solute-transfer unit according to claim 13 in which the extractant inlet port is connected to a source of extractant liquid.

15. The membrane-separation unit according to claim 13 in which
(b.1) lthe porous membrane is in the shape of a hollow tube, the interior of the tube defining a feed-solution chamber; and
(d.1) the second porous membrane is in the shape of a hollow tube, the interior of the tube defining a back extractant subchamber.

16. A membrane solute-transfer unit for transferring solute from a liquid feed solution to a liquid extractant, the solute-transfer unit comprising:
(a) a solute-transfer unit housing having extractant inlet port means for introducing a liquid extractant into an interior of the housing and extractant outlet port means for discharging the extractant from the interior of the housing, the housing having feed-solution inlet and outlet port means for introducing and discharging a feed solution from the interior of the housing, and the housing having auxiliary-extractant inlet port means for introducing a liquid auxiliary extractant into the interior of the housing and auxiliary-extractant outlet port means for discharging the auxiliary extractant from the interior of the housing;

(b) a plurality of hollow solute-transfer tubes, the solute-transfer tubes extending through the interior of the solute-transfer unit housing from the extractant inlet port means to the extractant outlet port means, the walls of the tubes being made of a porous membrane material the porous membrane material being preferentially wettable by one of the feed solution and the extractant liquid, interiors of the tubes communicating at an inlet end with the extractant inlet port means for receiving the liquid extractant and at an outlet end with the extractant outlet port means for discharging the extractant;

(c) extractant/feed-solution pressure difference control means for maintaining a difference between a liquid pressure of the extractant in the interior of the solute-transfer tubes and a liquid pressure of the feed solution in the interior of the separation unit housing exterior of the solute-transfer tubes substantially within a predetermined pressure range so that an interface between the feed solution and the extractant is substantially immobilized at the porous membrane wall of the solute-transfer tubes to effectively prevent the formation of a dispersion of feed solution and extractant in either the interior of the solute-transfer tubes or in the interior of the separation unit housing exterior of the solute-transfer tubes;

(d) a plurality of hollow auxiliary-extractant solute-transfer tubes, the auxiliary extractant solute-transfer tubes extending through the interior of the solute-transfer unit housing from the auxiliary-extractant inlet port means to the auxiliary-extractant outlet port means, the wall of the tubes being made of a porous membrane material, the porous membrane material being preferentially wettable by one of the auxiliary-extractant and the feed solution, interiors of the tubes communicating at an inlet end with the auxiliary-extractant inlet port means for receiving the auxiliary extractant and at an outlet end with the auxiliary-extractant outlet port means for discharging the auxiliary extractant; and (e) auxiliary-extractant/feed-solution pressure-difference control means for maintaining a difference between a liquid pressure of the auxiliary-extractant in the interior of the auxiliary-extractant solute-transfer tubes and a liquid pressure of the feed solution in the interior of the separation unit housing exterior of the auxiliary-extractant solute-transfer tubes substantially within a predetermined pressure range so that an interface between the feed solution and the auxiliary extractant is substantially immobilized at the porous membrane wall of the auxiliary-extractant solute-transfer tubes to effectively prevent the formation of a dispersion of feed solution and auxiliary-extractant in either the interior of the auxiliary-extractant solute-transfer tube or in the interior of the separation unit housing exterior of the auxiliary-extractant solute-transfer tubes.

17. The membrane solute transfer unit according to claim 16 in which the extractant inlet and outlet port means is connected to a source of liquid extractant.

18. A membrane solute transfer unit for transferring solute from a liquid feed solution to a liquid extractant, the solute-transfer unit comprising:

(a) a solute-transfer unit housing having feed-solution inlet port means for introducing a feed solution into an interior of the housing and feed solution outlet port means for discharging the feed solution from the interior of the housing, the housing having extractant inlet and outlet port means for introducing and discharging an extractant from the interior of the housing, the housing having back-extractant inlet port means for introducing a liquid back extratant into the interior of the housing and back-extractant outlet port means for discharging the back extractant from the interior of the housing;

(b) a plurality of hollow solute-transfer tubes, the solute-transfer tubes extending through the interior of the solute-transfer unit housing from the feed-solution inlet port means to the feed-solution outlet port means, the walls of the tubes being made of a porous membrane material, the porous membrane material being preferentially wettable by one of the feed solution and the extractant liquid, interiors of the tubes communicating at an inlet end with the feed-solution inlet port means for receiving the feed-solution and at an outlet end with the feed solution outlet port means for discharging the feed solution;

(c) feed-solution/extractant pressure difference control means for maintaining a difference between a liquid pressure or a feed solution in the interior of the solute-transfer tubes and a liquid pressure of an extractant in the interior of the separation unit housing exterior of the solute-transfer tubes substantially within a predetermined pressure range so that an interface between the feed solution and the extractant is substantially immobilized at the porous membrane wall of the solute-transfer tubes to effectively prevent the formation of a dispersion of feed solution and extractant in either the interior of the solute-transfer tubes or in the interior of the separation unit housing exterior of the solute-transfer tubes;

(d) a plurality of hollow back-extractant solute-transfer tubes, the back-extractant solute-transfer tubes extending through the interior of the solute-transfer unit housing from the back-extractant inlet port means to the back-extractant outlet port means, the walls of the tubes being made of a porous membrane material the porous membrane material being preferentially wettable by one of the extractant liquid and the back-extractant, the back-extractant solute-transfer tubes commingling with the solute-transfer tubes, interiors of the back-extractant solute-transfer tubes communicating at an inlet end with the back-extractant inlet port means for receiving the back-extractant liquid and at an outlet end with the back-extractant outlet port means for discharging the back extractant; and (e) back-extractant/extractant pressure difference control means for maintaining a difference between a liquid pressure of a back-extractant liquid in the interior of the back-extractant solute-transfer tubes and a liquid pressure of the extractant in the interior of the separation unit housing exterior of the back-extractant solute-transfer tubes substantially within the predetermined pressure range so that an interface between the back extractant and the extractant is substantially immobilized at the porous membrane wall of the back-extractant solute-transfer tubes to effectively prevent the formation of a dispersion of back-extractant and extractant in either the interior of the back-extractant solute-transfer tubes or in the interior of the separation unit housing exterior of the back-extractant solute-transfer tubes.

19. The membrane solute-transfer unit according to claim 18 in which the extractant inlet port means is connected to a source of liquid extractant and the auxiliary-extractant inlet port means is connected to a source of liquid auxiliary extractant.

* * * * *